Figure 1:
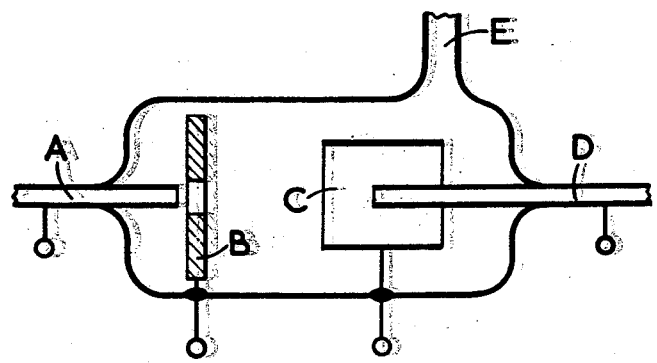

United States Patent Office 3,171,028
Patented Feb. 23, 1965

3,171,028
ULTRAVIOLET GAS ANALYSIS USING A FLOW-THROUGH TYPE IONIZATION CHAMBER
James Ephraim Lovelock, Bower Chalke, near Salisbury, England, assignor to National Research Development Corporation, London, England, a British corporation
Filed Sept. 11, 1961, Ser. No. 137,141
Claims priority, application Great Britain, Sept. 16, 1960, 31,964/60; Mar. 15, 1961, 9,462/61
8 Claims. (Cl. 250—83.6)

This invention relates to methods of and apparatus for the measurement of concentration of a gas or vapour contained in a mixture with a carrier gas. One use of the invention is in connection with gas chromatography, for the quantitative measurement of the successive gases or vapours emerging from a chromatograph column.

Sensitive ionisation methods for the measurement of low gas or vapour concentrations require the ionisation of a gas or vapour under test to be effected under conditions in which a carrier gas is unionised. Known methods include the ionisation of carbon compound vapours in a hydrogen flame and the reaction between gases and vapours and rare gas metastables.

An object of the present invention is to provide a method of measurement employing a simple alternative method of effecting the ionisation of the gas or vapour under test.

Another object of the invention is to provide a device adapted for use as an ionisation detector suitable for use in connection with such measurements.

According to one aspect of the present invention, a method of measuring the concentration of a gas or vapour to be tested, which is contained in a mixture with a carrier gas, comprises irradiating the mixture in an ionisation chamber with ultraviolet light of such frequency that photoionisation of the test gas or vapour occurs without any accompanying ionisation of the carrier gas and measuring the ionisation current produced, the ultraviolet light being produced by means of an electrical discharge in a clean gas derived from a source separate from the said mixture.

The ionisation chamber preferably contains two sets of electrodes, of which one set comprises a first hollow electrode through which the discharge-sustaining gas is introduced into the chamber and another electrode, this set of electrodes in operation being connected to a source of D.C. potential or radio-frequency energy such that a discharge current of the order of a few milliamperes is maintained between them, and the second set comprises a second hollow electrode and another electrode encircling said second hollow electrode to define a region within which ionisation occurs, the said mixture being introduced into the chamber through the said second hollow electrode, the said second set of electrodes being connected in operation to means for measuring the ionisation current, the two sets of electrodes being disposed so that the ultraviolet radiation is presented towards the said ionisation region. Means may be provided whereby the interior of the chamber may be maintained at a pressure substantially lower than atmospheric pressure for maintaining the discharge.

By a clean gas is meant one which does not contain any substantial amount of other gases or vapours which can absorb that part of the UV radiation required for ionisation or any contaminants which might adversely the stability of the discharge. Preferably also the gas should not contain any substantial amount of other gases or vapours which are capable of decomposing to deposit solids on the surfaces of the chamber.

According to another aspect of the invention, a device adapted for use as an ionisation detector in the aforesaid method comprises a chamber containing two sets of electrodes of which one set is adapted to be connected to effect the said electrical discharge, one of the electrodes of the set being hollow so as to permit the introduction into the chamber of the discharge-sustaining gas, and the second set is adapted to serve as detector electrodes for the ionisation current produced, one electrode of the second set being hollow so as to permit the introduction into the chamber of the said mixture and being encircled by the other electrode of the set to thereby define the region within which ionisation of the test gas or vapour occurs, the two sets of electrodes being disposed so that the ultraviolet radiation from the discharge is presented towards the said ionisation region. If desired, the device may be so constructed as to enable the interior of the device to be maintained at a pressure substantially lower than atmospheric pressure.

According to a feature of the invention the two sets of electrodes may be arranged so that one electrode is common to both sets, the first set comprising the first-mentioned hollow electrode and the common electrode, and the second set comprising the second-mentioned hollow electrode and the common electrode.

Thus a device for use as an ionisation detector in the foregoing method may comprise a chamber containing first and second electrodes adapted to be connected to effect the said electrical discharge and a third electrode, the first electrode being hollow so as to permit the introduction into the chamber of the discharge-sustaining gas and the said second and third electrodes being adapted to serve as detector electrodes for the ionisation current produced, the said third electrode being hollow so as to permit the introduction into the chamber of the said mixture and being encircled by a portion of the said second electrode to thereby define a region within which ionisation of the test gas or vapour occurs, the electrodes being disposed so that the ultraviolet radiation is presented towards the said ionisation region. If desired, the device may be constructed so as to enable the interior of the device to be maintained at a pressure substantially lower than atmospheric pressure.

In such a device the said first and third electrodes are preferably of tubular construction, extending towards each other from opposite ends of the device, and the second electrode conveniently has a cylindrical portion encircling the said third electrode and a transverse wall at the end of the cylindrical portion adjacent the first electrode, the said wall having an aperture facing the first electrode. If desired, a grid-like electrode may be provided, extending over the said aperture, adjacent the face of the said wall remote from the first electrode.

Figure 2:
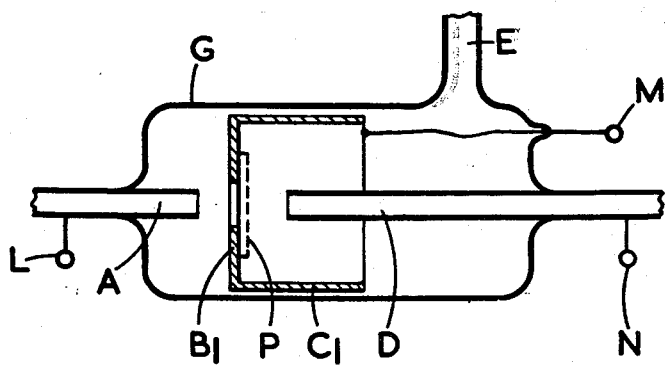

The invention will now be described with reference to the accompanying drawings in which FIGURES 1 and 2 show diagrammatically two alternative forms of a device adapted for use as an ionisation detector in accordance with the invention.

The device illustrated in FIGURE 1 comprises a glass envelope of the order of 4 cms. in length and 2 cms. in diameter. The device is in the form of a chamber containing two sets of electrodes A, B and C, D and is provided with an exhaust outlet E.

A first hollow electrode A, through which a discharge-sustaining gas is introduced into the chamber, is preferably formed of a refractory metal such as niobium, tantalum or zirconium. The electrode B is annular, being formed of any convenient metal, e.g. copper. As shown, the electrodes A, B are provided with terminals for the application of a suitable source of D.C. potential (of say 500 to 1000 volts) or of radio-frequency energy (say of the order of 20 to 50 megacycles per second) and in operation a steady discharge is maintained between these electrodes at a current of say 0.5 to 10 milliamperes. A clean discharge-sustaining gas is fed from a separate source into the chamber through electrode A and the discharge provides a source of UV light and hence of photons for producing ionisation of the gas or vapour under test, which is introduced into the chamber, in a mixture with a carrier gas, through a second hollow electrode D. This latter electrode conveniently serves as a collector electrode for free electrons (and negative molecular ions, if present) resulting from ionisation within the region defined by a cylindrical electrode C, which encircles electrode D, which in operation is maintained at a positive potential with respect to electrode C. Electrode D may be of any convenient metal and electrode C of any suitable metal (e.g. oxidised copper) which does not emit photo-electrons to any substantial extent. The geometrical arrangement of electrode B in relation to electrode A is preferably such that electrode C is as far as possible shielded from direct radiation by the discharge so as to avoid the possibility of liberating photo-electrons from electrode C which would disturb the measurements by augmenting the ionisation current output from electrodes C and D which, as shown, are provided with terminals which are connected to a suitable ionisation-current measuring device, e.g. an electrometer-valve or other suitable high-impedance-input amplifier known in the art.

In the device of FIGURE 1 the electrodes are effectively arranged in two sets, A, B, and C, D. However it is possible so to arrange the electrodes that one electrode is common to both sets and in such an arrangement the electrodes B, C of FIGURE 1 may be substituted by a single electrode, and such an arrangement is shown in FIGURE 2.

The device illustrated in FIGURE 2 comprises a glass envelope G and is in the form of a chamber containing three electrodes A, $B_1C_1$ and D, and is provided with an exhaust outlet E.

The first electrode, A, which may for example be of platinum, is of tubular construction and through it in operation a discharge-sustaining gas is introduced into the chamber. The second electrode, $B_1C_1$, comprises a cylindrical portion $C_1$, which encircles the third electrode D, and a transverse end wall $B_1$ having a central aperture facing the electrode A. The second electrode is formed of any convenient metal. The third electrode D is of tubular construction and may be formed of platinum. The first and second electrodes are provided with terminals L, M for connection respectively to negative and positive terminals of a suitable source of D.C. potential so that in operation a steady discharge is maintained between those electrodes at a current of up to a few milliamperes, with a clean discharge-sustaining gas (for example argon) being fed from a separate source into the chamber through the first electrode A. The discharge provides a source of UV light for producing ionisation of the gas or vapour under test, which is introduced into the chamber, in a mixture with a carrier gas (which may also be argon), through the hollow third electrode D. This latter electrode may serve as a collector electrode for free electrons (and negative molecular ions, if present) resulting from ionisation within the region defined by the cylindrical portion $C_1$ of the second electrode, in which case the electrode D is maintained, via terminal N, at a potential more positive than that of the second electrode, and the terminals M and N being connected to suitable ionisation-current measuring apparatus. Alternatively the electrode D may serve as a collector for positive ions and portion $C_1$ as an electron collector, in which case electrode D is maintained at a potential more negative than that of the second electrode. This alternative mode of operation may be preferred since it appears to enable a lower background current to be obtained.

If desired, a grid-like electrode P may be provided, extending over the aperture in the wall $B_1$ of the second electrode, and this may prevent free electrons arising from the discharge from affecting the ionisation current produced between the second and third electrodes.

If the discharge-sustaining gas is $H_2$, $N_2$ or A, it may be necessary, particularly where the discharge is energised by D.C., to operate the detector device of FIGURE 1 or FIGURE 2 at a pressure less than 100 mm. of mercury to maintain a stable discharge and to enable this the outlet E is connected to a suitable exhausting pump. It will also be necessary to restrict the inlets to A and D (say, to an internal diameter of 0.01 inch) to enable the low operating pressure to be maintained.

With helium as the discharge-sustaining gas, particularly if the discharge is effected by R.F. energy, a stable discharge is possible at atmospheric pressure, in which case outlet E is merely left open to atmosphere.

The carrier gas in which the gas or vapour under test is introduced must be chosen in relation to the range of UV wavelengths available from the discharge so that the carrier gas will not itself be ionised. In practice this is not difficult and in many cases water-saturated air will give entirely satisfactory results.

In practice the discharge-sustaining gas is one of the rare gases or $N_2$ or $H_2$. Where measurement of the concentration of permanent gases is required, He is preferably used as the discharge-sustaining gas and the He must be pure so that there is no absorption by impurities of the UV in the discharge.

The frequency of UV light required to ionise any particular gas or vapour is closely related to its first ionisation potential. The higher this ionisation potential is, the shorter must be the wavelength of the UV to be employed.

The upper limit of the photon energy obtainable from the discharge is determined by the nature of the discharge-sustaining gas. Hence by choosing a gas such as He very short wavelength UV light can be generated with sufficient energy to ionise any other gas or vapour (in which case it will be necessary also to employ He as the carrier gas in the mixture containing the gases or vapours to be tested, since otherwise ionisation of the carrier gas itself will be effected and will confuse the measure).

Conversely, by choosing a gas with relatively low photon energy, the ionisation of certain desired gases or vapours can be achieved without ionisation of contaminants or other gases or vapours present in the mixture carrying the desired gases or vapours. By suitable choice from one of the rare gases or $H_2$ or $N_2$ a supply of photons may be obtained of sufficient energy to ionise the vapours of almost all polyatomic compounds but with insufficient energy to ionise simple diatomic gases and water vapour which are frequently present in the mixture or are employed as the carrier gas in the mixture.

Furthermore, an additional control of the maximum photo energy available in the ionisation region can be obtained by including within the chamber a gas with an appropriate absorption of UV light to serve as a filter, provided of course that such absorption does not lead to ionisation of the absorbing gas. For example the ionisation potentials and photon energies required for ionisation of the saturated hydrocarbons are greater than those required for ionisation of the corresponding unsaturated hydrocarbons. Hence by the choice of a suitable filter (i.e. UV absorber) the selective ionisation of unsaturated hydrocarbons in the presence of saturated hydrocarbons is possible.

With the detector illustrated in FIGURE 1, in the absence of ionisable gas or vapour an output signal of approximately $10^{-10}$ ampere was obtained, due possibly to photo-electric emission of electrons from the surfaces of the electrode C. In practical measurements the steady component of this background current may be offset at the input of the measuring device by an equal opposing current from a suitable external source, so that a zero measurement is obtained in the absence of a test gas or vapour. In the presence of ionisable gas or vapour a substantially linear response to gas or vapour concentration was obtained up to an ionisation current output signal of $10^{-7}$ ampere. The efficiency of ionisation of test molecules introduced was of the order of 0.01 percent. The response of the device appeared to be insensitive to gross contamination of its surfaces by dirt or decomposition products and was stable over long periods and on repeated operation. The stability of this detector, unlike that of other discharge methods of measuring vapour concentration, is believed to be due to the fact that the discharge is always maintained within the clean and uncontaminated supply of gas supplied through the hollow electrode A.

Various modifications may be made without exceeding the scope of the invention. For example, the envelope of the device may be of other material than glass.

I claim:
1. A device for use as an ionisation detector, comprising a chamber containing two sets of electrodes, one of which set is connected to effect an electrical discharge, one of the electrodes of the set being hollow so as to permit the introduction into the chamber of a discharge-sustaining gas, the electrical discharge in the discharge sustaining gas producing an ultra-violet radiation, and the second set of electrodes serving as detector electrodes for ionisation current produced by the ultraviolet radiation, one electrode of the second set being hollow so as to permit the introduction into the chamber of a gas mixture, said one electrode being encircled by the other electrode of the set to thereby define the region within which ionisation of the gas mixture occurs, the two sets of electrodes being disposed so that the ultraviolet radiation from the discharge is directed towards the said ionisation region.

2. A device according to claim 1, and further including an exhaust outlet shaped to enable the connection of means for maintaining the interior of the device at a pressure substantially lower than atmospheric pressure.

3. A device according to claim 1, in which the two sets of electrodes are arranged so that one electrode is common to both sets, the first set comprising the first-mentioned hollow electrode and the common electrode and the second set comprising the second-mentioned hollow electrode and the common electrode.

4. A device for use as an ionisation detector, comprising a chamber containing first and second electrodes adapted to be connected to effect an electrical discharge and a third electrode, the first electrode being hollow so as to permit the introduction into the chamber of a discharge-sustaining gas and the said second and third electrodes being adapted to serve as detector electrodes for the ionisation current produced, the said third electrode being hollow so as to permit the introduction into the chamber of a gas, said third electrode being encircled by a portion of the said second electrode to thereby define a region within which ionisation of the gas mixture occurs, the electrodes being disposed so that the ultraviolet radiation is directed towards the said ionisation region.

5. A device according to claim 4, and further including an exhaust outlet shaped to enable the connection of means for maintaining the interior of the device at a pressure substantially lower than atmospheric pressure.

6. A device according to claim 4, in which the said first and third electrodes are of tubular construction, extending towards each other from opposite ends of the device, and the said second electrode has a cylindrical portion encircling the said third electrode and a transverse wall at the end of the cylindrical portion adjacent the first electrode, the said wall having an aperture facing the first electrode.

7. A device according to claim 6, and further including a grid-like electrode extending over the said aperture, adjacent the face of the said wall remote from the first electrode.

8. A method of measuring the concentration of a gas or vapor to be tested which is contained in a mixture with a carrier gas comprising the steps of feeding a clean discharge sustaining gas to a chamber, producing ultraviolet light by means of an electrical discharge in the discharge sustaining gas in the chamber, feeding the gas mixture of the gas to be tested and the carrier gas to said chamber, irradiating the mixture with the ultraviolet light so that photoionisation of the test gas occurs without any accompanying ionisation of the carrier gas, and measuring the ionisation current produced.

References Cited in the file of this patent

UNITED STATES PATENTS

| | | |
|---|---|---|
| 2,670,649 | Robinson | Mar. 2, 1954 |
| 2,901,625 | Friedman et al | Aug. 25, 1959 |
| 2,950,387 | Brubaker | Aug. 23, 1960 |
| 2,959,677 | Robinson et al. | Nov. 8, 1960 |
| 3,025,745 | Liston | Mar. 20, 1962 |
| 3,032,654 | Fay et al. | May 1, 1962 |
| 3,046,396 | Lovelock | July 24, 1962 |
| 3,110,809 | Lovelock | Nov. 12, 1963 |